United States Patent
Nash et al.

(10) Patent No.: US 9,692,799 B2
(45) Date of Patent: Jun. 27, 2017

(54) SYSTEM AND METHOD FOR SENDING AND/OR RECEIVING DIGITAL CONTENT BASED ON A DELIVERY SPECIFICATION

(75) Inventors: Michael Gregory Nash, Kanata (CA); Tony Vasile, Ottawa (CA); Ian Kennedy Hamilton, Ottawa (CA)

(73) Assignee: Signiant Inc., Lexington, MA (US)

( * ) Notice: Subject to any disclaimer, the term of this patent is extended or adjusted under 35 U.S.C. 154(b) by 415 days.

(21) Appl. No.: 13/561,461

(22) Filed: Jul. 30, 2012

(65) Prior Publication Data

US 2014/0032503 A1      Jan. 30, 2014

(51) Int. Cl.
*G06F 17/30* (2006.01)
*H04L 29/06* (2006.01)
*H04L 29/08* (2006.01)

(52) U.S. Cl.
CPC .... *H04L 65/4084* (2013.01); *G06F 17/30029* (2013.01); *G06F 17/30761* (2013.01); *G06F 17/30828* (2013.01); *H04L 65/608* (2013.01); *H04L 65/80* (2013.01); *H04L 67/306* (2013.01)

(58) Field of Classification Search
CPC ......... G06F 17/30761; G06F 17/30772; G06F 17/30867; G06F 17/30017
USPC ....... 707/705–780; 709/201–203; 725/1–153
See application file for complete search history.

(56) References Cited

U.S. PATENT DOCUMENTS

| | | | |
|---|---|---|---|
| 5,319,644 A | 6/1994 | Liang | 370/85.5 |
| 5,519,863 A | 5/1996 | Allen et al. | 395/650 |
| 5,552,776 A | 9/1996 | Wade et al. | 340/825.31 |
| 5,737,495 A | 4/1998 | Adams et al. | 395/615 |
| 5,796,966 A | 8/1998 | Simcoe et al. | 395/311 |
| 5,999,979 A | 12/1999 | Vellanki et al. | 709/232 |
| 6,006,019 A | 12/1999 | Takei | 395/200.54 |
| 6,064,656 A | 5/2000 | Angal et al. | 370/254 |
| 6,085,251 A | 7/2000 | Fabozzi, II | 709/230 |

(Continued)

FOREIGN PATENT DOCUMENTS

WO      WO 2006/019490      2/2006

OTHER PUBLICATIONS

Waldrop, Clarence, et al., "Making a TCP/IP Connection Through a Firewall", Candle Advanced Technical Corner Tips and Tricks, copyright 2003, 7 pages.

(Continued)

*Primary Examiner* — Michelle Owyang
(74) *Attorney, Agent, or Firm* — Sheppard Mullin Richter & Hampton LLP

(57) ABSTRACT

A plurality of users may interact with a content distribution system in order to share digital media content. The system may receive, store, and/or publish a delivery specification that includes requirements relating to digital content that a first user wishes to receive. The delivery specification for the digital content may include one or more requirements of the digital content to be received. A second user who wishes to provide the digital content may access the delivery specification. The system provides for flexible validation of the media content from the second user. For example, validation may occur at device of the first user, at a device of the second user, and/or at a device of the content distribution system. Upon validation of the media content from the second user, the system may facilitate transfer of the media content from the second user to the first user.

41 Claims, 8 Drawing Sheets

(56) References Cited

U.S. PATENT DOCUMENTS

| | | | |
|---|---|---|---|
| 6,128,653 A | 10/2000 | del Val et al. | 709/219 |
| 6,163,543 A | 12/2000 | Chin et al. | 370/400 |
| 6,163,809 A | 12/2000 | Buckley | 709/237 |
| 6,192,412 B1 | 2/2001 | Cantoral et al. | 709/236 |
| 6,199,109 B1 | 3/2001 | Reder et al. | 709/224 |
| 6,219,706 B1 | 4/2001 | Fan et al. | 709/225 |
| 6,298,061 B1 | 10/2001 | Chin et al. | 370/400 |
| 6,396,511 B1 | 5/2002 | Karino | 345/744 |
| 6,405,256 B1 | 6/2002 | Lin et al. | 709/231 |
| 6,438,598 B1 | 8/2002 | Pedersen | 709/227 |
| 6,463,465 B1 | 10/2002 | Nieuwejaar | 709/217 |
| 6,557,122 B1 | 4/2003 | Sugauchi et al. | 714/57 |
| 6,600,812 B1 | 7/2003 | Gentillin et al. | 379/45 |
| 6,701,437 B1 | 3/2004 | Hoke et al. | 713/201 |
| 6,718,361 B1 | 4/2004 | Basani et al. | 709/201 |
| 6,742,023 B1 | 5/2004 | Fanning et al. | 709/219 |
| 6,760,861 B2 | 7/2004 | Fukuhara et al. | 714/4 |
| 6,763,384 B1 | 7/2004 | Gupta et al. | 709/224 |
| 6,823,373 B1 | 11/2004 | Pancha et al. | 709/219 |
| 6,859,835 B1 | 2/2005 | Hipp | 709/227 |
| 6,925,495 B2 | 8/2005 | Hegde et al. | 709/223 |
| 6,976,095 B1 | 12/2005 | Wolrich et al. | 709/250 |
| 6,996,631 B1 | 2/2006 | Aiken, Jr. et al. | 709/242 |
| 7,051,365 B1 | 5/2006 | Bellovin | 726/11 |
| 7,054,935 B2 | 5/2006 | Farber et al. | 709/226 |
| 7,103,889 B2 | 9/2006 | Hiltgen | 719/317 |
| 7,113,963 B1 | 9/2006 | McCaw | 707/204 |
| 7,139,805 B2 | 11/2006 | Seagren et al. | 709/207 |
| 7,139,811 B2 | 11/2006 | Lev Ran et al. | 709/217 |
| 7,152,105 B2 | 12/2006 | McClure et al. | 709/224 |
| 7,152,108 B1 | 12/2006 | Khan et al. | 709/225 |
| 7,177,897 B2 | 2/2007 | Manukyan | 709/200 |
| 7,257,630 B2 | 8/2007 | Cole et al. | 709/224 |
| 7,308,710 B2 | 12/2007 | Yarborough | 726/11 |
| 7,343,301 B1 | 3/2008 | Nash et al. | 705/1 |
| 7,403,934 B2 | 7/2008 | Polizzi | 707/1 |
| 7,406,533 B2 | 7/2008 | Li et al. | 709/236 |
| 7,447,775 B1 | 11/2008 | Zhu et al. | 709/226 |
| 7,461,067 B2 | 12/2008 | Dewing et al. | 707/10 |
| 7,478,146 B2 | 1/2009 | Tervo et al. | 709/223 |
| 7,526,557 B2 | 4/2009 | Bowler | 709/227 |
| 7,552,192 B2 | 6/2009 | Carmichael | 709/217 |
| 7,606,562 B2 | 10/2009 | Aaltonen et al. | 455/414.1 |
| 7,676,675 B2 | 3/2010 | Billharz et al. | 713/168 |
| 7,707,271 B2 | 4/2010 | Rudkin et al. | 709/218 |
| 7,716,312 B2 | 5/2010 | Gamble | 709/223 |
| 7,913,280 B1 * | 3/2011 | Roberts | H04N 21/4532 725/109 |
| 8,081,956 B2 | 12/2011 | Aaltonen et al. | 455/414.1 |
| 8,667,145 B2 | 3/2014 | Bowler | 709/227 |
| 8,930,475 B1 | 1/2015 | North | |
| 2002/0032769 A1 | 3/2002 | Barkai et al. | 709/224 |
| 2002/0049834 A1 | 4/2002 | Molnar | 709/219 |
| 2002/0077909 A1 | 6/2002 | Kanojia et al. | 705/14 |
| 2002/0099729 A1 | 7/2002 | Chandrasekaran et al. | 707/203 |
| 2002/0104008 A1 | 8/2002 | Cochran et al. | 713/200 |
| 2002/0116485 A1 | 8/2002 | Black et al. | 709/223 |
| 2002/0116616 A1 | 8/2002 | Mi et al. | 713/168 |
| 2002/0165961 A1 | 11/2002 | Everdell et al. | 709/225 |
| 2002/0169694 A1 | 11/2002 | Stone et al. | 705/27 |
| 2002/0199000 A1 | 12/2002 | Banerjee | 709/227 |
| 2003/0014482 A1 | 1/2003 | Toyota et al. | 709/203 |
| 2003/0028495 A1 | 2/2003 | Pallante | 705/78 |
| 2003/0028647 A1 | 2/2003 | Grosu | 709/227 |
| 2003/0046103 A1 | 3/2003 | Amato et al. | 705/1 |
| 2003/0051026 A1 | 3/2003 | Carter et al. | 709/224 |
| 2003/0056096 A1 | 3/2003 | Albert et al. | 713/168 |
| 2003/0065950 A1 | 4/2003 | Yarborough | 713/201 |
| 2003/0088694 A1 | 5/2003 | Patek et al. | 709/238 |
| 2003/0105830 A1 | 6/2003 | Pham et al. | 709/216 |
| 2003/0115302 A1 | 6/2003 | Teraoaka et al. | 709/221 |
| 2003/0115361 A1 | 6/2003 | Kirk et al. | 709/244 |
| 2003/0120822 A1 | 6/2003 | Langrind et al. | 709/251 |
| 2003/0126195 A1 | 7/2003 | Reynolds et al. | 709/203 |
| 2003/0212806 A1 | 11/2003 | Mowers et al. | 709/229 |
| 2003/0216958 A1 | 11/2003 | Register et al. | 705/14 |
| 2003/0221014 A1 | 11/2003 | Kosiba et al. | 709/231 |
| 2004/0003152 A1 | 1/2004 | Fussell et al. | 710/100 |
| 2004/0015728 A1 | 1/2004 | Cole et al. | 713/201 |
| 2004/0049550 A1 | 3/2004 | Yu | 709/208 |
| 2004/0073681 A1 | 4/2004 | Fald | 709/227 |
| 2004/0093420 A1 | 5/2004 | Gamble | 709/231 |
| 2004/0117829 A1 * | 6/2004 | Karaoguz | H04L 29/06027 725/46 |
| 2004/0122888 A1 | 6/2004 | Carmichael | 709/200 |
| 2004/0139212 A1 | 7/2004 | Mukherjee et al. | 709/230 |
| 2004/0254914 A1 | 12/2004 | Polizzi | 707/3 |
| 2005/0044250 A1 | 2/2005 | Gay et al. | 709/230 |
| 2005/0086359 A1 | 4/2005 | Banerjee et al. | 709/232 |
| 2005/0086533 A1 | 4/2005 | Hsieh | 713/201 |
| 2005/0251575 A1 | 11/2005 | Bayardo et al. | 709/227 |
| 2005/0261796 A1 | 11/2005 | Shen | 700/121 |
| 2006/0015580 A1 | 1/2006 | Gabriel et al. | 709/219 |
| 2007/0073727 A1 * | 3/2007 | Klein et al. | 707/10 |
| 2007/0130143 A1 | 6/2007 | Zhang et al. | 707/8 |
| 2007/0185902 A1 | 8/2007 | Messinger et al. | 707/103 R |
| 2008/0016205 A1 * | 1/2008 | Svendsen | 709/224 |
| 2008/0250028 A1 | 10/2008 | Rutherglen et al. | 707/10 |
| 2008/0319760 A1 | 12/2008 | Da Palma et al. | 704/270.1 |
| 2009/0037520 A1 | 2/2009 | Loffredo | 709/203 |
| 2009/0077252 A1 * | 3/2009 | Svendsen et al. | 709/224 |
| 2009/0083117 A1 * | 3/2009 | Svendsen et al. | 705/10 |
| 2009/0083362 A1 * | 3/2009 | Svendsen | 709/201 |
| 2009/0138477 A1 | 5/2009 | Piira et al. | 707/10 |
| 2009/0164283 A1 | 6/2009 | Coley | 705/7 |
| 2010/0122180 A1 | 5/2010 | Kamiyama et al. | 715/744 |
| 2010/0205261 A1 | 8/2010 | Michel | 709/206 |
| 2010/0293147 A1 | 11/2010 | Snow et al. | 707/640 |
| 2011/0009991 A1 | 1/2011 | Dinicola et al. | 700/97 |
| 2011/0022642 A1 | 1/2011 | deMilo et al. | 707/805 |
| 2011/0225270 A1 | 9/2011 | Taniguchi et al. | 709/219 |
| 2014/0032503 A1 | 1/2014 | Nash | |

OTHER PUBLICATIONS

Premo, Rita, "A Picture-Perfect Travel Log; Working Wise; Avaya Inc.; Brief Article", Aug. 1, 2002, *Security Management*, No. 8, vol. 46, p. 25, ISSN: 0145-9406, pp. 1-3.

"ISOCOR Releases Industry's Most Powerful Message Server", Nov. 14, 1994, *M2 Presswire,* pp. 1-3.

"SmartFTP—What is FXP?", printed from http://www.smartflip.com/support/kb/what-is-fxp-f14.html, May 16, 2007, 1 page.

"Direct Client-to-Client"—Wikipedia, the free encyclopedia, printed from http://en.wikipedia.org/w/index.php?title=Direct_Clienet-to-Client&oldid=344943093, Feb. 19, 2010, 8 pages.

* cited by examiner

SYSTEM AND METHOD FOR SENDING AND/OR RECEIVING DIGITAL CONTENT BASED ON A DELIVERY SPECIFICATION

FIELD OF THE INVENTION

The invention relates to a system and method for facilitating digital content movement based on a delivery specification and more particularly to a system and method for facilitating digital content movement by making available the delivery specification for determining whether the digital content complies with the delivery specification.

BACKGROUND OF THE INVENTION

Generally speaking, electronic file transfer can occur over public or private networks using a variety of techniques including peer-to-peer file sharing and client server file transfer. The ability to use the content of electronic files transferred may be more problematic. Particularly, the useful exchange of electronic files containing digital media content, such as movies, music, videos, and so forth, may require the transfer of files in specific formats with specific characteristics. For example, a conventional system may not be able to use digital media content that does not include specific files types or contain media encoded at rates outside of system specifications. As a result, various solutions have emerged to tailor the receipt of digital media content based on the file characteristics.

Conventional systems, however, typically deal only with transferring digital media content over a network and not managing and applying rules about what can be transferred. This results in inefficient use of network resources and impedes straight through processing with no human intervention.

Conventional systems for exchanging digital media content suffer from these and other problems.

SUMMARY OF THE INVENTION

The invention solving these and other drawbacks of conventional systems relates to a system and method for facilitating the communication of a delivery specification relating to transferring digital content (as used herein, "digital content" is used interchangeably with "media file," which can include streamed digital content as well as digital content transmitted as a discreet file).

In some implementations, a plurality of users may register with a content distribution system in order to interact with the system such as by sending and/or receiving a delivery specification and/or digital media content. In some implementations, unregistered users may interact with the system. In some of implementations, the system may record or otherwise register the unregistered user with the system after the unregistered user interacts with the system. For example, the system may register an unregistered user after the unregistered user accesses a delivery specification.

In some implementations, upon receipt of the delivery specification, the system may publish or otherwise make available the delivery specification to registered and/or unregistered users. In some implementations, the system may make available the delivery specification via various channels such as, for example, via a webpage, a web portal, an agent (such as a software and/or hardware module) executing on a client device that communicates with the system that stores the delivery specifications, electronic mail and/or other communication channel that can be used to make the delivery specification available to a user.

In some implementations, a delivery specification may include one or more requirements that specify attributes of the media file. A requirement in the delivery specification may include an attribute that the media file has in order to comply with the requirement. For example, a requirement may relate to the file specification, the content specification, the media track specification, video track format requirements, audio track format requirements, and/or data track format requirements, among others.

In some implementations, a delivery specification may include one or more requirements relating to the file specification, such as the acceptable type(s) of files (e.g. XML, MXF, WMV, MOV, etc.), a maximum and/or minimum size of the file, and/or content specification requirements. The content specification requirements may include an XMLSchema and/or a set of media track specifications that include minimum and maximum occurrences for each media track specified. The media track specifications may include video track specification, audio track specifications, and data track specifications. The video track specifications may include requirements relating to attributes such as display width, display height, frame rate, aspect ratio, codec, bit rate, and bit rate mode, among others. The audio track specifications may include requirements relating to attributes such as sampling rate, audio encoding, and bit rate, among others. The data track specifications may include requirements relating to attributes such as captioning format and ANC data, among others. In some implementations, each requirement in the delivery specification is fulfilled by the media file to show compliance with the delivery specification.

In some implementations, the delivery specification may include one or more requirements related to a package, which may include more than one discreet file. For example, a requirement of a media file may specify that more than one discreet file should be received such as a metadata file that describes a discreet media file along with the discreet media file itself. In some implementations, the requirement may relate to the metadata and/or the discreet media file.

By receiving, storing, and/or making available the delivery specification from and to various users, the system facilitates determinations of whether a media file of one user complies with the requirements of a delivery specification of another user. In this manner, a flexible architecture may be achieved in which a media file may be validated against a delivery specification at one or more of a plurality of locations such as at a device of a user receiving the media file, at a device of a user sending the media file, and/or at a device of the system that stores and makes available the delivery specification.

The system may receive a delivery specification from a first user and receive a request from a second user for the media delivery specification. The system may communicate the delivery specification to the second user based on the user request. In this example, the second user may determine whether one of its media files complies with the requirements of the media delivery request. If so, the second registered user may directly or indirectly communicate the complying media file to the first user.

In some implementations, a second user may access the delivery specification at the system and may communicate to the system information relating to one or more of its media files to the system. In this example, the system may determine whether the media file of the second user complies with the requirements of the delivery specification based on the information it receives from the second user. In this case, the system may then send a confirmation or denial to the second user depending on whether the received information indicates compliance of the media file with the delivery specification. If the second registered user receives confirmation that the media file complies with the delivery specification, the second registered user may send the media file to the first registered user.

In some implementations, the first user may receive a media file that may or may not have been validated against the delivery specification. In some implementations, the first user may determine whether the media file complies with the delivery specification. If the media file does not comply, the first user may reject and/or discard the media file. If the media file does comply, the first registered user may accept the media file for use and/or storage.

Other objects and advantages of the invention will be apparent to those skilled in the art based on the following drawings and detailed description.

DETAILED DESCRIPTION

A system and method for facilitating communication of delivery specifications that includes one or more requirements of a media file may be provided.

Figure 1:
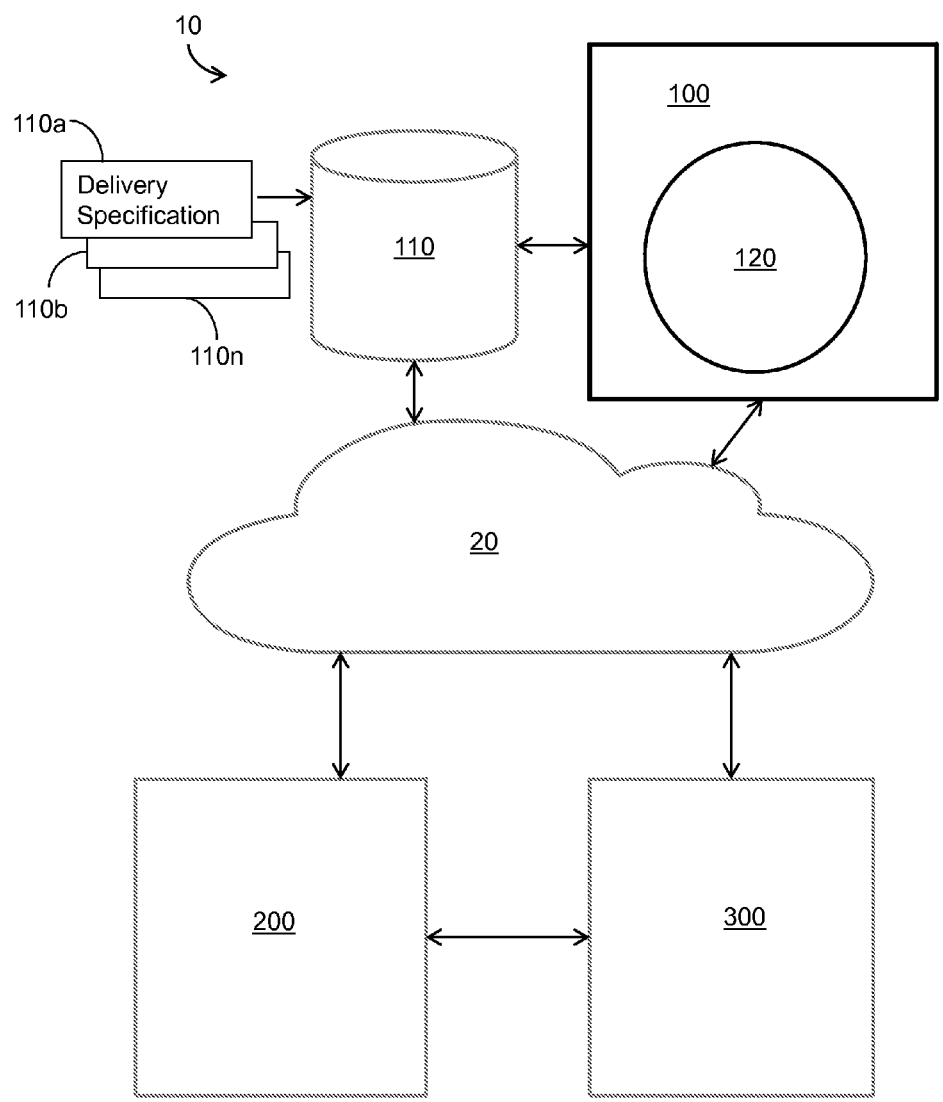
FIG. 1 illustrates a block diagram of an exemplary system for facilitating communication of a delivery specification in relation to a media transfer, according to an implementation of the invention.

FIG. 1 illustrates an exemplary diagram of a system 10 for facilitating communication of delivery specifications 110a-n, according to an implementation of the invention. The system 10 may include a network 20, a delivery specification repository 110, a specification delivery device 100, a receiving device 200 and a sending device 300. One or more registered users may access the system to communicate, store, and access delivery specifications and/or media files.

A user may comprise a person, an organization, a company or corporation, and/or any other entity or individual who accesses the system. A registered user may include a user that has registered with the system such as by providing identifying and/or other information about the user. An unregistered user may include a user that is not a registered user. A user (whether registered or not) may use any device (such as, for example, receiving device 200 and/or sending device 300) that is capable of communicating with the system to access the system. In some implementations, a registered user may identify itself via the device in order for the device to access the system. For example, a registered user may communicate a username and password from their device via a web-based or other channel in order to be identified by the system. Other methods of identification using devices may also be used (e.g., authentication, encrypted communications, the use of cookies on the device, and so forth).

As shown in FIG. 1, the system 10 may include a delivery specification repository 110. In some implementations, a delivery specification 110a may include a one or more requirements that specify attributes of the digital media to be delivered to a registered user. For example, the delivery specification may include one or more requirements relating to one or more of the file specification, the content specification, the media track specification, video track format requirements, audio track format requirements, and/or data track format requirements, among others. The delivery specification may be communicated using any appropriate format such as a word processing document, one or more database entries, a plaintext document, an HTML/XML page, and/or other formats that can specific attributes of digital media. The delivery specification may include various data such as, for example, a delivery specification identifier, a reference to the media request for which it provides requirements, a reference to the registered user to whom the media file is to be delivered, and/or other information related to the media or the intended receiver of the media file associated with the delivery specification.

In some implementations, a delivery specification 110a may specify requirements for a package, which may include more than one discreet file required by the delivery specification 110a that are related to one another. For example, a delivery specification 110 may specify requirements for an XML file that contains metadata, a video file that contains a video clip of a specified length, and an audio file that may be related to the video file. Included in this example delivery specification may also be requirements relating to one or more of the file specification, the content specification, the media track specification, video track format requirements, audio track format requirements, and/or data track format requirements, among others, for one or more of the XML file, the video file, and the audio file.

The delivery specification repository 110 may store the delivery specifications 110a-n. In some implementations, the delivery specification repository 110 may also store profile information for registered users of the system 10. The profile information may include at least a user identifier for the registered user, contact information for the user (i.e., first and last name, email address, authentication information, etc.), and/or other relevant data.

In some implementations, the profile information may store the prior activity of users. For example, the profile information may include a number of times that a user has received media via the system and/or the number of times that the user has stored a delivery specification for a media request in the delivery specification repository 110 (and the associated delivery specification or media request identifier (s)). In another example, the profile information may also include the number of times that the user has accessed a delivery specification (and the associated delivery specification or media request identifier(s)). The profile information may also include the number of times that the user has submitted or attempted to submit media in response to accessing a delivery specification (and the associated delivery specification or media request identifier(s)).

In some implementations, the delivery specification repository 110 is searchable. For example, the entries in the repository 110 (i.e., the delivery specifications 110*a-n*) may be searchable by keyword, media category or type, features specified in the delivery specification such as requested media file size or requested media file type, and/or by other information related to the delivery specification or the intended receiver of the media file associated with the delivery specification. In some implementations, the registered users may receive notifications when a delivery specification is newly stored and/or otherwise received at the delivery specification repository 110. In some implementations, registered users may subscribe to receive notifications of when delivery specifications associated with one or more other registered users are newly stored and/or otherwise received at the delivery specification repository 110.

In some implementations, the delivery specification repository 110 (and the delivery specifications 110*a-n*) are made publicly available for access and/or download via various communication channels such as, for example, via a webpage, a web portal, an agent (such as a software and/or hardware module) executing on a client device that communicates with the system that stores the hardware specifications, electronic mail and/or other communication channel that can be used to make the delivery specification available to a user.

In some implementations, only registered users may provide a delivery specification 110*a* to the delivery specification repository 110. In other implementations, users that are not registered may provide a delivery specification 110*a* to the delivery specification repository 110.

As shown in FIG. 1, the system 10 may also include a specification delivery device 100. In some implementations, the specification delivery device 100 may comprise one or more processors and storage and may be in communication with the delivery specification repository 110. The specification delivery device 100 may be configured to register a plurality of users and store information related to the plurality of users, receive a delivery specification for a media file to be delivered to the receiving device 200, identify the sending device 300 to access a delivery specification, store the delivery specification, facilitate transfer of a media file to the receiving device 200, and facilitate access to the delivery specification by the sending device 300.

Figure 2:
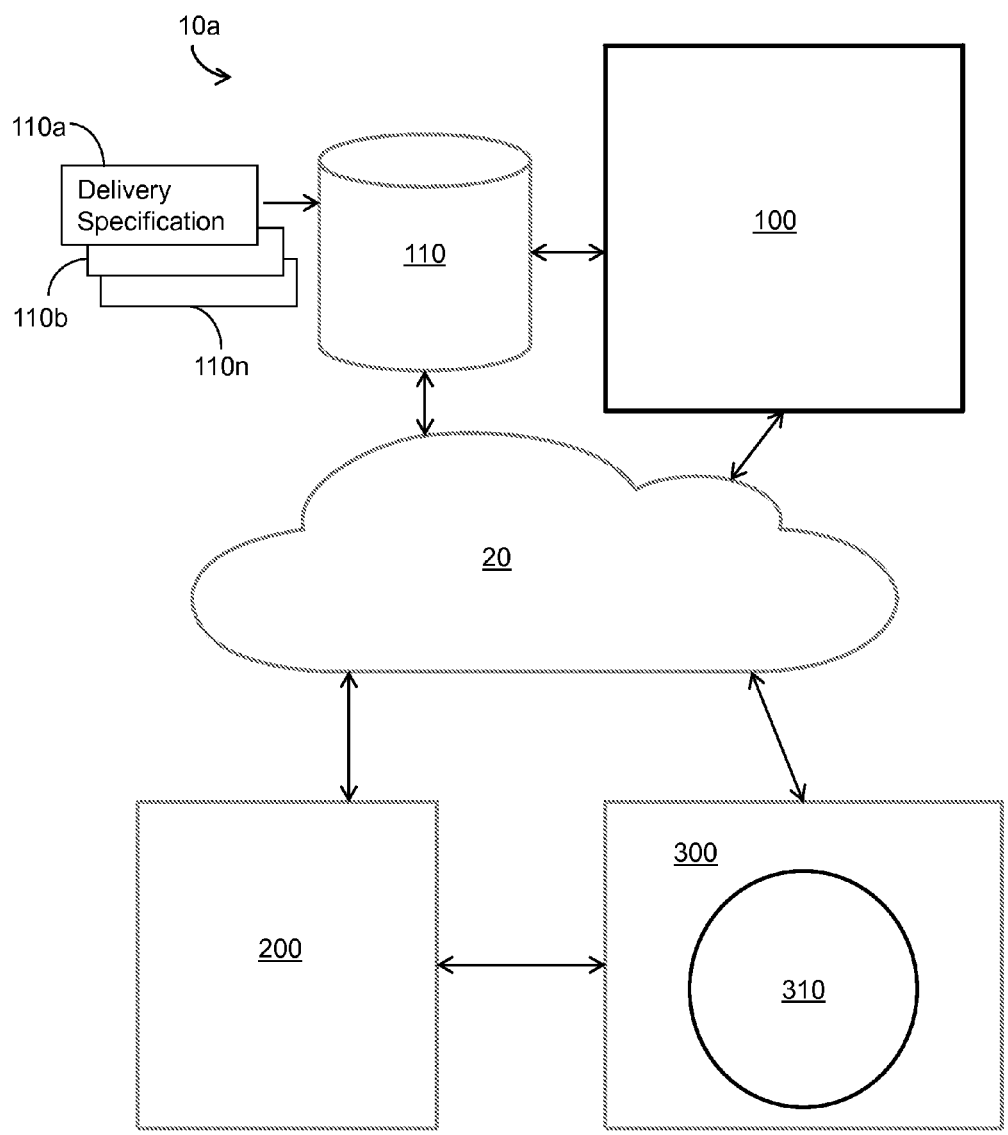
FIG. 2 illustrates a block diagram of another exemplary system for facilitating communication of a delivery specification in relation to a media transfer, according to an implementation of the invention.
Figure 3:
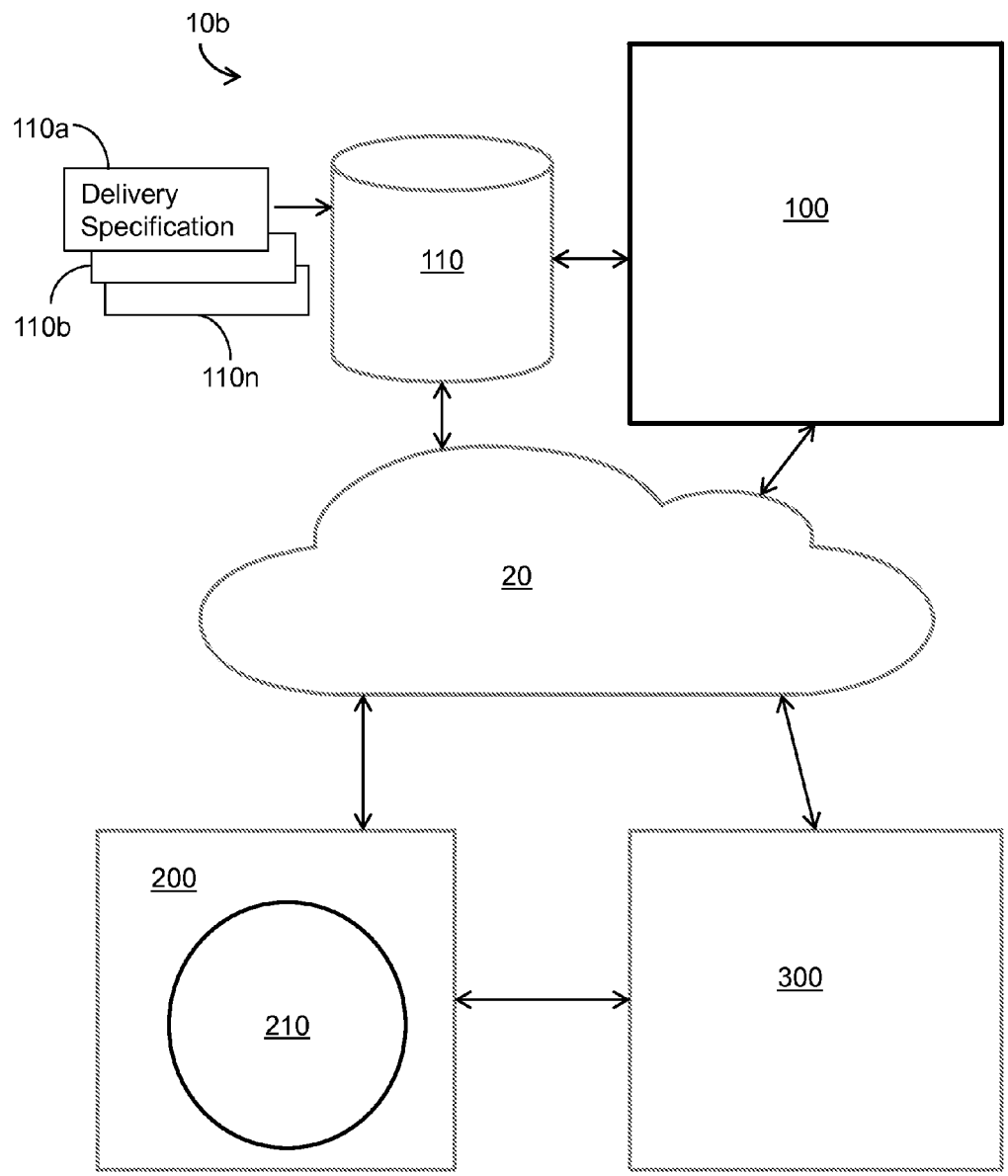
FIG. 3 illustrates a block diagram of another exemplary system for facilitating communication of a delivery specification in relation to a media transfer, according to an implementation of the invention.

In some implementations, a media validator 120 may access or receive a delivery specification and determine whether a media file complies with the requirements of the delivery specification. The media validator 120 may receive information that describes a media file and determine whether the information indicates that the media file complies with the requirements set forth in the delivery specification. In some implementations, media validator 120 analyzes the media file or information related to the media file and determines whether the media file complies with the requirements of the delivery specification. For example, the media validator 120 may extract or otherwise receive a header from the media file, determine metadata regarding the media file, determine information from the media file, and/or parse the media file. In some implementations, the media validator 120 may be implemented on one or more system components. For example, as illustrated in FIG. 1-3, the media validator 120 may be a component of or otherwise be implemented by specification delivery device 100, the receiving device 200 and/or the sending device 300.

In some implementations, receiving device 200 may include a device used by a user to interact with the system in various ways. For example, via receiving device 200, a user may upload or otherwise specify requirements of a delivery specification 110, receive a media file, validate the media file based on the delivery specification, and/or perform other operations related to transferring media files. In some implementations, the receiving device 200 may be used to authenticate to the system 10 by sharing secrets with the system 10. In some implementations, the receiving device 200 receives media based on a delivery specification stored in the delivery specification repository 110.

In some implementations, the receiving device 200 may be used to provide the delivery specification 110 to the specification delivery device 100. In some implementations, the receiving device 200 may receive a media file based on the delivery specification, which may be stored in the delivery specification repository 110. In some implementations, the received media file is already validated by another device such as by sending device 300 and/or by specification delivery device 100. In some implementations, the received media file is not validated. Whether the received media file is already validated or not, in some implementations, the receiving device 200 may validate the media file based on the delivery specification.

In some implementations, the receiving device 200 may include an agent (such as a software and/or hardware module) that facilitates the communication and/or validation of a media file as described herein. For example, the agent may facilitate communication with specification delivery device 100 and/or with a counterpart agent executing at sending device 300.

In some implementations, receiving device 200 may be used to specify different delivery specifications for different types of content. For example, a delivery specification may be used for high-definition content while another delivery specification may be used for standard-definition content. In another example, a delivery specification may be used for one type of programming while another delivery specification may be used for another type of programming. Other examples using different delivery specifications for different types may be used.

In some implementations, the receiving device 200 may be associated (e.g., used by) a media delivery service such as a television channel or network. The media file to be delivered to the receiving device 200 may include content such as video, audio, text, and/or other content to be displayed on the channel or network. The delivery specification may include requirements for the media file to be displayed. For example, the delivery specification may specify requirements high-definition or standard-definition format. In this example, the receiving device 200 may have a first delivery specification for a first media file in standard-definition format and a second delivery specification for a second media file in high-definition format.

In some implementations, the media file may be related to or include various content such as, for example, an advertisement, a public service announcement, television programming, and/or other types of content that may be communicated via a media file.

In an example implementation as shown in FIG. 1, the media validator 120 resides at the specification delivery device 100. A delivery specification 110a is stored in the delivery specification repository 110. In this example implementation, the sending device 300 may extract information about the media file to be sent and sends it to the media validator 120 for validation based on the intended receiving device 200 and associated deliver specification. The media validator 120 may send a signal (e.g., a confirmation or denial) to the sending device 300 based on whether media file to be sent complies with the requirements of delivery specification 110a.

If the sending device 300 receives confirmation that the media file complies with the requirements set forth in the delivery specification 110a, the sending device 300 may facilitate communication of the media file to the registered user (or a device of the registered user) associated with the delivery specification 110a (in this case, the receiving device 200). For example, the sending device 300 may send the media file to the receiving device 200.

In the example implementation shown in FIG. 2, the media validator 310 resides at the sending device 300. This example implementation is carried out in the same manner as the example implementation described above with respect to FIG. 1, except for at least the following differences. In this example implementation, in response to receiving or accessing the delivery specification 110a, the media validator 310 residing at the sending device 300 will determine whether a media file at the sending device 300 complies with the requirements of delivery specification 110a.

If the media validator 310 finds that the media file complies with the requirements set forth in the delivery specification 110a, the sending device 300 may facilitate communication of the media file to the registered user (or device of the registered user) associated with the delivery specification 110a (in this case, the first registered user 100). For example, the sending device 300 may send the media file to the receiving device 200.

In some implementations, the sending device 300 may have the media validator 310 analyze one or more media files to determine whether a media file complies with the requirements of the delivery specification. In some implementations, the media validator 310 may continue to analyze media files until the media validator 310 determines that a media file complies with the requirements of the delivery specification or no more media files are available or accessible to analyze. In some implementations, the media validator 310 may analyze at least a specified number of media files.

In the example implementation shown in FIG. 3, the media validator 210 resides at the receiving device 200. This example implementation is carried out in the same manner as the example implementation described above with respect to FIG. 1, except for at least the following differences. In this example implementation, the media validator 210 resides at the receiving device 200. In this example implementation, the receiving device 200 may retrieve or access a delivery specification 110a from the repository 110. In some implementations, the receiving device 200 will already maintain a copy of the delivery specification 110a. The receiving device 200 may also receive a media file that is associated with the delivery specification 110a. The media file may be from another registered user or corresponding user device (e.g., the sending device 300). The media validator 210 may determine whether the media file complies with the requirements of the delivery specification 110a. In some implementations, the sending device 300 may also access the delivery specification 110a before sending the media file to the receiving device 200. If the media validator 210 finds that the media file complies with the requirements set forth in the delivery specification 110a, the receiving device 200 may accept that media file. Otherwise, the receiving device 200 may reject and/or discard the media file.

Figure 4:
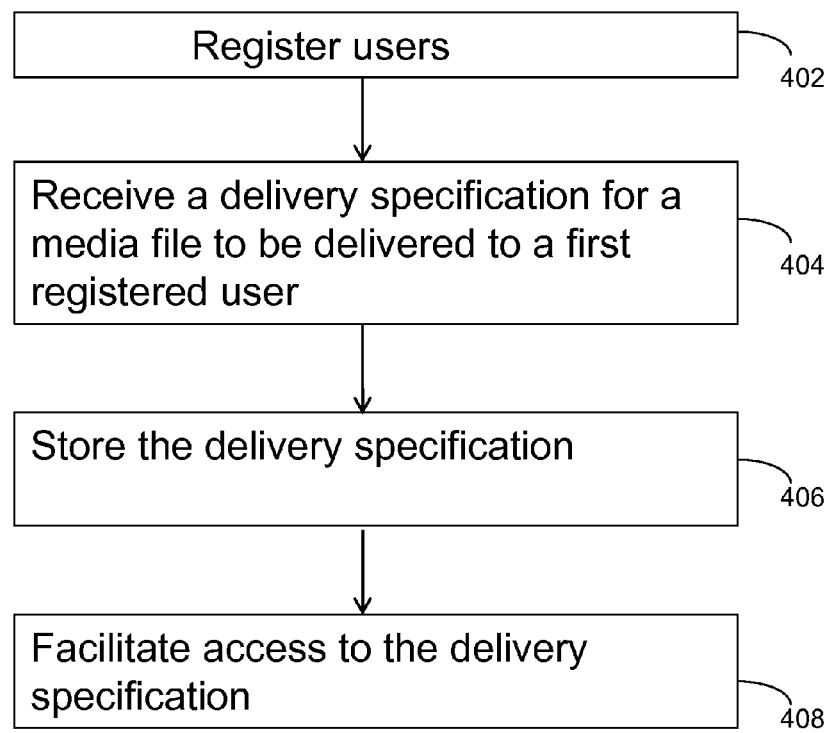
FIG. 4 illustrates a flowchart of an exemplary process of facilitating communication of a delivery specification in relation to a media transfer, according to an implementation of the invention.

FIG. 4 illustrates a process 400 for facilitating communication of a delivery specification associated with a media request according to various implementations of the invention. The described operations of FIG. 4 and other drawing figures may be accomplished using some or all of the system components described in detail above and, in some implementations, various operations may be performed in different sequences. In other implementations, additional operations may be performed along with some or all of the operations shown in FIG. 4 and the other drawing figures. In yet other implementations, one or more operations may be performed simultaneously. In yet other implementations, one or more combinations of various operations may be performed. Some implementations may not perform all of the operations described with relation to FIG. 4 and other drawing figures. Accordingly, the operations described are exemplary in nature and, as such, should not be viewed as limiting.

In an operation 402, users are registered in the system 10. In some implementations, users are registered with the system 10 and profile information for the registered users is stored at the network, for example, at the repository 110 or at a separate database or computing device of the network. In some implementations, profiles may be created for respective users as they are registered in the system 10.

In operation 404, a delivery specification 110a for a media file to be delivered to a receiving device 200 is stored at the repository 110. In some implementations, when a delivery specification 110a is stored at the repository 110, the system 10 may publish the delivery specification 110a to users such as by making the delivery specification 110a available via a web-based portal to registered and non-registered users, and/or otherwise make available the delivery specification 110a.

In an operation 406, the specification delivery device 100 and/or the delivery specification repository 110 may store the delivery specification. The specification delivery device 100 and/or the delivery specification repository 110 may also identify a sending device 300 to access the delivery specification 110a. For example, the specification delivery device 100 and/or the delivery specification repository 110 may identify the sending device 300 by receiving a request (e.g., a request for a webpage or other type of request) from the sending device 300 to access the delivery specification 110a. In another example, the specification delivery device 100 and/or the delivery specification repository 110 may identify the sending device 300 by receiving, at the receiving device 200, a media file from the sending device 300. In another example, the specification delivery device 100 and/or the delivery specification repository 110 may identify the sending device 300 by receiving, from the sending device 300, a request to receive the delivery specification 110a. Other methods of identifying the sending device 300 also exist.

In an operation 408, the specification delivery device 100 and/or the delivery specification repository 110 facilitate access to the delivery specification 110a to the sending device 300. The sending device 300 may access the delivery specification 110a to provide a media file for validation using the delivery specification 110a for the receiving device 200. In some implementations, the media validator 210 may reside at the receiving device 200. In some implementations, the media validator 120, 310, may reside at the specification delivery device 100 or the sending device 300 respectively.

In some implementations, the delivery specification may indicate at which device (the specification delivery device 100, the receiving device 200, or the sending device 300) validation may occur. In some implementations, the delivery specification may indicate whether the receiving device 200 is willing to accept media files that have not been validated as complying with the requirements of the delivery specification. In these implementations, the specification delivery device 100 and the sending device 300 may communicate and determine which of the devices (a media validator 120 at the network or a media validator 310 at the sending device 300) may validate the media file. In some implementations, the profile information of a registered device associated with the delivery specification 110a may indicate where validation of media files may occur.

Figure 5:
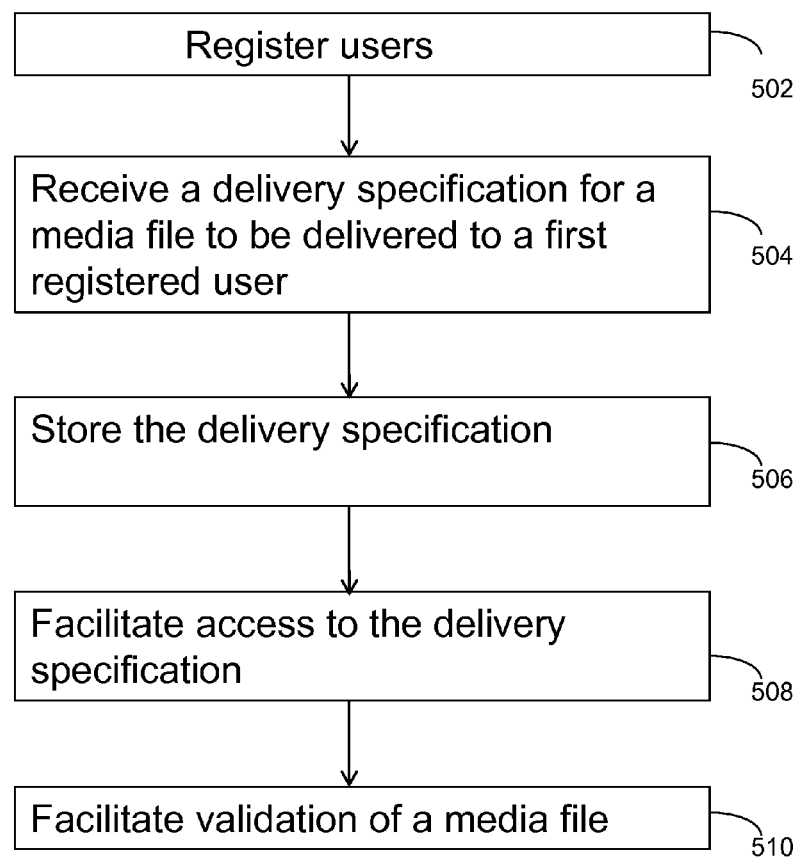
FIG. 5 illustrates a flowchart of another exemplary process of facilitating communication of a delivery specification in relation to a media transfer, according to an implementation of the invention.

FIG. 5 illustrates a process 500 for facilitating communication of a delivery specification for a media file to be delivered to a registered user according to various implementations of the invention. The process illustrated in FIG. 5 is similar to the process illustrated in FIG. 4 with at least the following differences in operation. In an operation 510, the specification delivery device 100 facilitates validation of the media file. In some implementations, the specification delivery device 100 and/or the delivery specification repository 110 facilitates access to the delivery specification to the device at which validation occurs. In some implementations, the media validator 120, 210, 310, may reside at the specification delivery device 100, the receiving device 200, or the sending device 300.

Figure 6A:
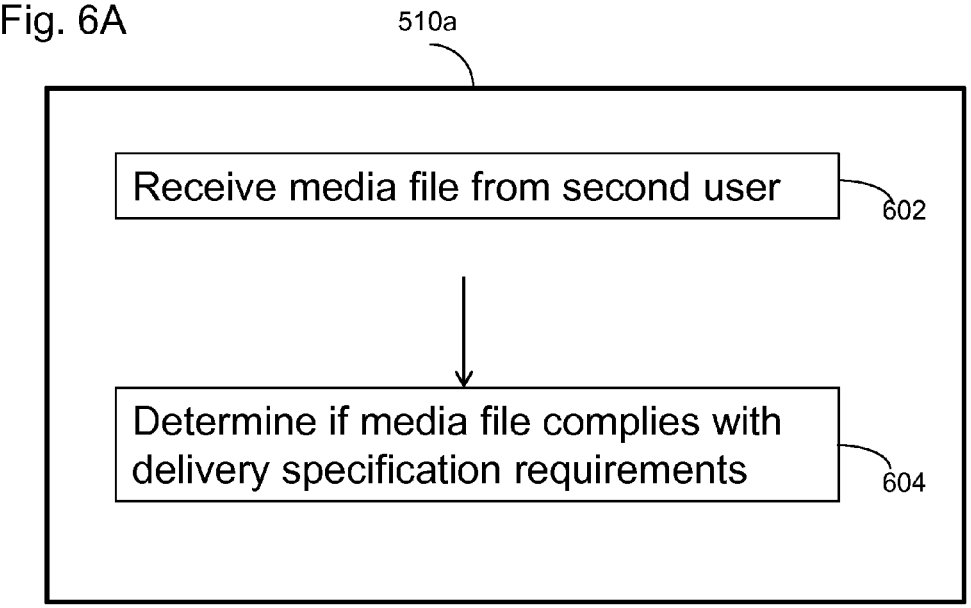
FIG. 6A illustrates a flowchart depicting an exemplary operation for facilitating validation of a media file, according to an implementation of the invention.

In an implementation in which the media validator resides at the specification delivery device 100 such as that illustrated in FIG. 6A, the media validator 120 of the specification delivery device 100 may receive the media file from the sending device 300 (operation 602) and may determine whether the media file complies with the requirements set forth in the delivery specification 110a (operation 604). In this implementation, the media validator 120 or the specification delivery device 100 may send a signal to the sending device 300 communicating that determination.

Figure 6B:
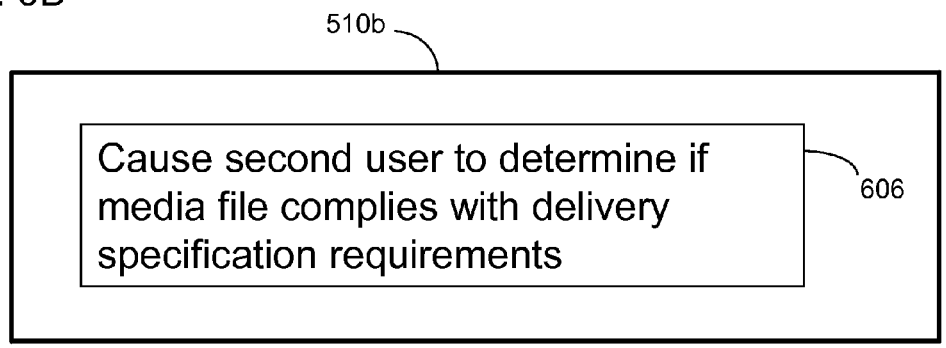
FIG. 6B illustrates a flowchart depicting an exemplary operation for facilitating validation of a media file, according to an implementation of the invention.

In an implementation in which the media validator 310 resides at the sending device 300 as illustrated in FIG. 6B, the specification delivery device 100 and/or the delivery specification repository 110 may facilitate communication of the delivery specification 110a to the sending device 300 and the media validator 310 may determine whether the media file complies with the requirements set forth in the delivery specification 110a (operation 606). In this implementation, the sending device 300 may facilitate communication of the media file to the receiving device 200 (via, for example, an agent at the sending device 300 that can communicate with an agent at the receiving device 200) based on the determination of the media validator 310. In this implementation, the specification delivery device 100 may cause the sending device 300 to determine whether the media file complies with the requirements set forth in the delivery specification 110a.

Figure 6C:
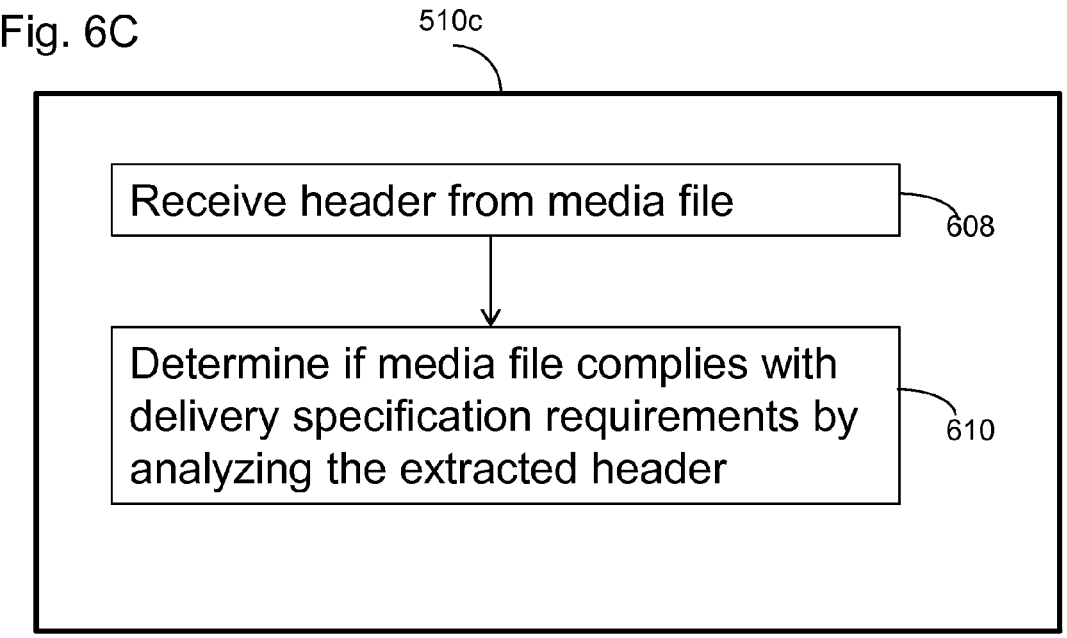
FIG. 6C illustrates a flowchart depicting an exemplary operation for facilitating validation of a media file, according to an implementation of the invention.

In another implementation in which the media validator 120 resides at the specification delivery device 100 such as that illustrated in FIG. 6C, the media validator 120 may determine or otherwise receive a header extracted from the media file (or other information such as metadata, etc. describing the media file) from the sending device 300 (operation 608) and may determine whether the media file complies with the requirements set forth in the delivery specification 110a by analyzing the extracted header or other information (operation 610). In this implementation, the media validator 310 may also reside at the sending device 300, whereby the media validator 310 only considers an extracted header or other information from a media file of the sending device 300.

Figure 6D:
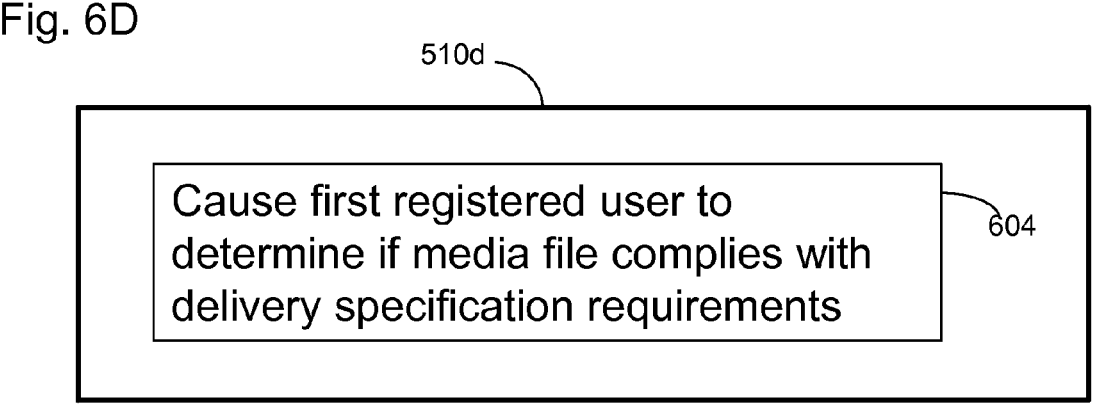
FIG. 6D illustrates a flowchart depicting an exemplary operation for facilitating validation of a media file, according to an implementation of the invention.

In some implementations, the specification delivery device 100 and/or the delivery specification repository 110 may facilitate access to the delivery specification for the receiving device 200 (in cases where the receiving device 200 does not already have the delivery specification), and the media validator 210 may reside at the receiving device 200. In these implementations, as illustrated in FIG. 6D, the media validator 210 at the receiving device 200 may determine whether a received media file complies with the requirements set forth in the delivery specification 110a (operation 612). In this implementation, the specification delivery device 100 may cause the receiving device 200 to determine whether the media file complies with the requirements set forth in the delivery specification 110a.

Figure 7:
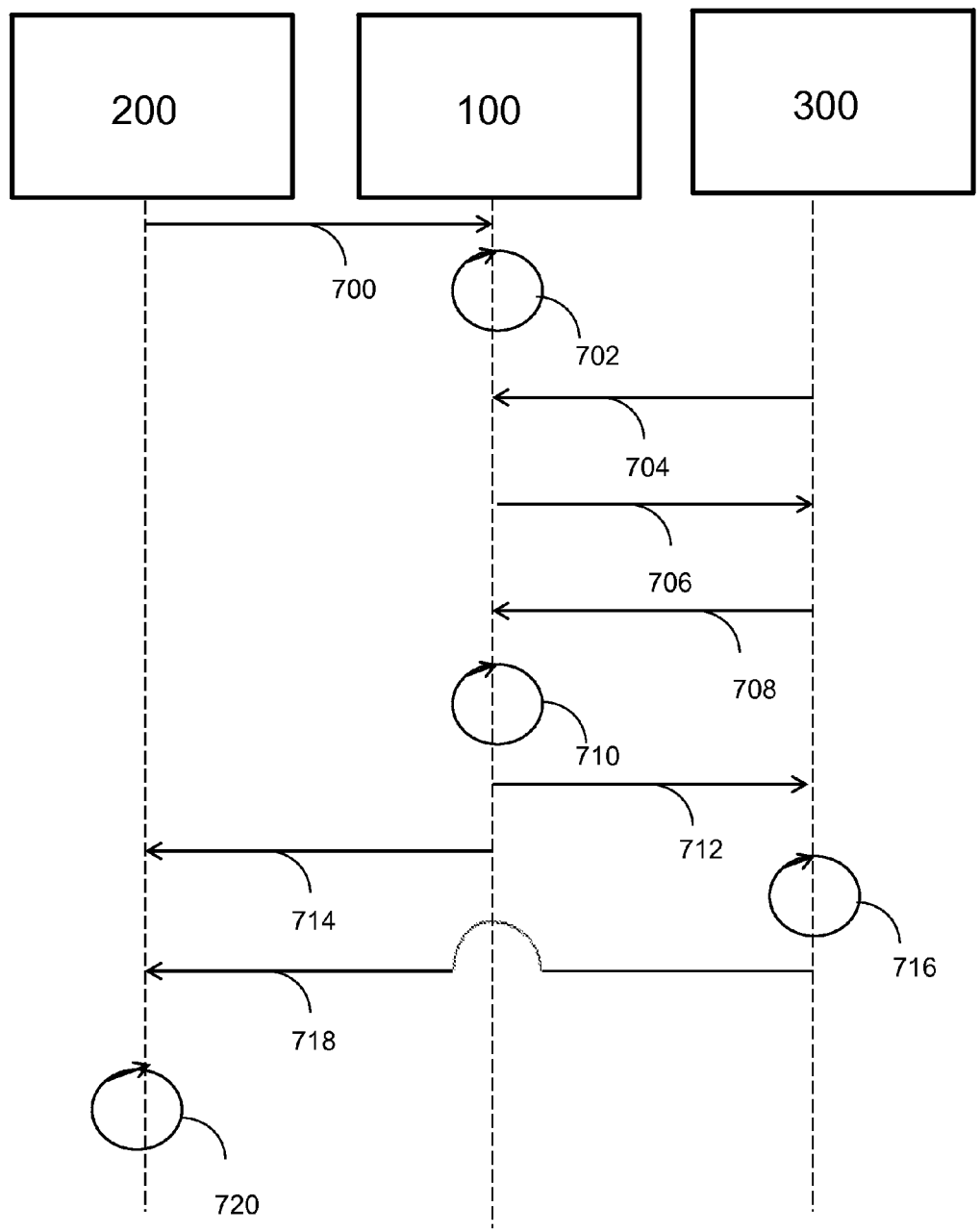
FIG. 7 illustrates a data flow of an exemplary method of facilitating communication of a delivery specification in relation to a media request, according to an implementation of the invention.

FIG. 7 illustrates a data flow diagram for facilitating communication of a delivery specification associated with a media request according to various implementations of the invention. FIG. 7 may depict the possibility of a variety of different implementations.

In some implementations, in operation 700, specification delivery device 100 may receive a delivery specification from receiving device 200, which may use specification delivery device 100 to publish the delivery specification.

In operation 702, the specification delivery device 100 stores and/or publishes the delivery specification 110a. For example, the delivery specification 110a may be stored at the delivery specification repository 110, may be published to one or more users of the system 10. In some implementations, the delivery specification repository 110 and/or the specification delivery device 100 may receive a request from the sending device 300 for the delivery specification 110a in operation 704. The request may include, for example a URL request for a web page or web portal, or other request for the delivery specification.

In operation 706, the specification delivery device 100 may communicate the delivery specification to the sending device 300. For example, the specification delivery device 100 may communicate the delivery specification via a webpage, portal, agent operating on sending device 300, and/or other interface. As would be appreciated, communicating the delivery specification to sending device 300 can include but does not require that the sending device 300 download the delivery specification to a persistent memory.

In operation 708, specification delivery device 100 receives information from the sending device 300. In some examples, the information may include a media file, a header extracted from the media file, metadata relating to the media file, and/or other information that can be used to validate the media file. In operation 710, the media validator 120 residing at the specification delivery device 100 determines whether the media file from the sending device 300 complies with the requirements of the delivery specification 110a by analyzing the information received (e.g. the media file, the extracted header, the metadata, and/or other information). In operation 712, the media validator 120 may send an indication to the sending device 300 regarding its determination.

In operation 718, the specification delivery device facilitates communication of the media file to the receiving device 200. For example, if the media validator 120 has sent a signal indicating that the media file of the sending device 300 complies with the requirements set forth in the delivery specification 110a, the sending device 300 facilitates communication of the media file to the receiving device 200 via a web page, a web portal, an agent operating on the sending device 300 and/or the receiving device 200, one or more third party computers, and/or other method of communicating data. In some implementations, if the information analyzed by the media validator 120 includes the media file from the sending device 300, the specification delivery device 100 may facilitate communication of the media file to the receiving device 200 in operation 714.

In some implementations, in operation 700, a delivery specification 110a for a media file to be delivered to the receiving device 200 is received at the delivery specification repository 110 and/or the specification delivery device 100. The delivery specification 110a may be received from the receiving device 200, the sending device 300, a device of another registered user, or a device of a non-registered user.

In operation 720, the receiving device 200, via media validator 210, may determine whether the media file received from the sending device 300 complies with the requirements of the delivery specification.

The specification delivery device 100 may be any computing device such as, for example, a server, a desktop computer, laptop computer, personal digital assistant, smart phone, and/or any other computing device. Other configurations and system architectures may be used. For example, although not shown, specification delivery device 100 may be or include one or more servers connected to one or more clients via a network 20 such as a Wide Area Network, Local Area Network, the Internet, a cloud-based network and/or other network or combination thereof. The specification delivery device 100 may be capable of communicating with network 20, delivery specification repository 110 and one or more other registered user devices, such as receiving device 200 and sending device 300.

The receiving device 200 may be any computing device such as, for example, a server, a desktop computer, laptop computer, personal digital assistant, smart phone, and/or any other computing device. The receiving device 200 may be capable of communicating with network 20, specification delivery device 100, the delivery specification repository 110, and one or more other registered user devices, such as sending device 300.

In some implementations, the receiving device 200 communicates with second registered user device without the use of intermediary user devices or clients (i.e. directly through a network). In some implementations, receiving device 200 communicates with sending device 300 via the use of an intermediary (e.g. via the specification delivery device 100). In some implementations, receiving device 200 communicates with sending device 300 via the network 20. In some implementations, the receiving device 200 is able to communicate with sending device 300 over the Internet and/or without communicating via network 20 or a part of network 20.

The sending device 300 may be any computing device such as, for example, a server, a desktop computer, laptop computer, personal digital assistant, smart phone, and/or any other computing device. The sending device 300 may be capable of communicating with network 20, specification delivery device 100, the delivery specification repository 110, and one or more other registered user devices, such as receiving device 200.

The delivery specification repository 110 may be at least one database that stores system data such as profile information for the registered users, delivery specifications associated with one or more registered users, or any other data. The delivery specification repository 110 may be associated and communicate with the specification delivery device 100.

The one or more databases comprising the delivery specification repository 110 may be, include, or interface to, for example, an Oracle™ relational database sold commercially by Oracle Corporation. Other databases, such as Informix™, DB2 (Database 2) or other data storage, including file-based, object, or query formats, platforms, or resources such as OLAP (On Line Analytical Processing), SQL (Standard Query Language), NoSQL, a SAN (storage area network), Microsoft Access™ or other form of database may also be used, incorporated, or accessed. The database may comprise one or more such databases that reside in one or more physical devices and in one or more physical locations. The database may store a plurality of types of data and/or files and associated data or file descriptions, administrative information, or any other data.

In some implementations, the delivery specification repository 110 may be part of or hosted by a computing device on the network 20. In some implementations, the delivery specification repository 110 may be part of or hosted by the specification delivery device 100. In some implementations, the delivery specification repository 110 may be physically separate from the computing device but may be operably communicable therewith.

In some implementations, the media validator 120 may be part of or hosted by a computing device associated with the delivery specification repository 110. In some implementations, the media validator 120 may be physically separate from the computing device but may be operably communicable therewith. In some implementations, the media validator 120 may reside at a separate computing device, such as, for example a receiving device 200 or a sending device 300.

In addition, implementations of the invention may be made in hardware, firmware, software, or any suitable combination thereof. Aspects of the invention may also be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described herein in terms of specific exemplary aspects and implementations of the invention, and performing certain actions. However, it will be apparent that such descriptions are merely for convenience and that such actions in fact result from computing devices, processors, controllers, or other devices executing the firmware, software, routines, or instructions.

Aspects and implementations described herein as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other aspects or implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A system for facilitating communication of a delivery specification that specifies requirements of one or more media files to be provided from a sending device to a recipient device over a network, the system comprising:
a computing device comprising one or more physical processors programmed with computer program instructions, which when executed by the one or more physical processors cause the computing device to:
receive, from the recipient device associated with a first user, the delivery specification that includes a plurality of requirements, specified by the first user, of a media file to be delivered to the first user, wherein the delivery specification is used to determine whether the media file is acceptable to the first user, wherein the plurality of requirements include at least a file type requirement that specifies a type of file format required by the first user and a file size requirement that specifies a maximum and/or minimum size of file required by the first user, and wherein the media file comprises an executable multi-media file;
receive, from the sending device associated with a second user that is to provide the media file to the first user, a request for the delivery specification;
communicate the delivery specification to the sending device responsive to the request to provide the second user with the plurality of requirements specified by the first user;
receive, from the sending device, the media file;
validate, using the delivery specification, the media file based on the plurality of requirements; and
responsive to an indication that the media file is validated, and without sending the media file to the recipient device, provide a notification to the sending device that the media file has been validated.

2. The system of claim 1, wherein the computing device is further programmed to:
facilitate communication of the media file to the first user.

3. The system of claim 2, wherein to facilitate communication of the media file to the first user, the computing device is further programmed to:
cause the second user to communicate the media file to the first user.

4. The system of claim 1, wherein to validate the media file, the computing device is further programmed to:
receive the media file from the second user;
perform an analysis of the received media file based on the plurality of requirements;
determine that the media file is validated based on the analysis; and
communicate an indication to the second user that the media file is validated responsive to the determination that the media file is validated.

5. The system of claim 4, wherein the computing device is further programmed to:
cause the first user to receive the media file responsive to a determination that the media file is validated.

6. The system of claim 1, wherein to validate the media file, the computing device is further programmed to:
receive metadata relating to the media file, separate from the media file, from the second user;
perform an analysis of the received metadata based on the plurality of requirements;
determine that the media file is validated based on the analysis; and
communicate an indication to the second user that the media file is validated responsive to the determination that the media file is validated.

7. The system of claim 6, wherein the computing device is further programmed to:
cause the first user to receive the media file responsive to the determination that the media file is validated.

8. The system of claim 1, wherein the computing device is further programmed to:
identify the second user based on an access of the delivery specification by the second user.

9. The system of claim 1, wherein the computing device is further programmed to:
identify the second user based on a request from the second user for the delivery specification.

10. The system of claim 1, wherein the computing device is further programmed to:
identify the second user based on a subscription of the second user to receive delivery specifications for one or more media files to be delivered to the first user.

11. The system of claim 1, wherein the computing device is further programmed to receive the delivery specification from the first user via a third user.

12. The system of claim 1, wherein the delivery specification is a first type of delivery specification that is specific to a first type of content, and wherein the computing device is further programmed to:
receive, from the first user, a second delivery specification that includes a second plurality of requirements, specified by the first user, of a second media file to be delivered to the first user, wherein the second delivery specification is a second type of delivery specification that is specific to a second type of content different from the first type of content, and wherein the second plurality of requirements are different from the plurality of requirements.

13. The system of claim 12, wherein the first type of content relates to high-definition content such that the delivery specification specifies requirements for high-definition types of content, and wherein the second type of content relates to standard-definition content such that the second delivery specification specifies requirements for standard-definition types of content.

14. The system of claim 1, wherein the first type of content comprises a first type of programming and the second type of content comprises a second type of programming.

15. The system of claim 1, wherein the first user is associated with a television channel or network, and wherein the delivery specification relates to content to be displayed on the television channel or network.

16. The system of claim 1, wherein the request from the second user for the delivery specification is received via one or more of: a webpage, a web portal, an agent on a device associated with the second user, and an electronic mail.

17. The system of claim 1, wherein the computing device is further programmed to:

receive, from the second user, a request to subscribe to one or more delivery specifications associated with the first user;

store subscription information that indicates that the second user is a subscriber to one or more delivery specifications associated with the first user;

identify one or more subscribers, including the second user, of the one or more delivery specifications associated with the first user based on the subscription information responsive to a receipt of a delivery specification from the first user; and communicate an indication to the one or more subscribers that the delivery specification has been received from the first user.

18. The system of claim 4, wherein the computing device is further programmed to:

communicate an indication to the second user that the media file is denied responsive to a determination that the media file is not validated.

19. The system of claim 4, wherein to perform the analysis of the received media file based on the plurality of requirements, the computing device is further programmed to:

determine whether the received media file satisfies the file type requirement; and determine whether the received media file satisfies the file size requirement.

20. The system of claim 6, wherein to perform the analysis of the received information based on the plurality of requirements, the computing device is further programmed to:

determine whether the received information indicates that the media file satisfies the file type requirement; and determine whether the received information indicates that the media file satisfies the file size requirement.

21. A method for facilitating communication of delivery specifications that specifies requirements of one or more media files to be provided from a sending device to a recipient device over a network, the method being implemented on a computing device comprising one or more physical processors programmed with computer program instructions, which when executed by the one or more physical processors cause the computing device to perform the method, the method comprising:

receiving, by the computing device, from the recipient device associated with a first user, the delivery specification that includes a plurality of requirements, specified by the first user, of a media file to be delivered to the first user, wherein the delivery specification is used to determine whether the media file is acceptable to the first user, wherein the plurality of requirements include at least a file type requirement that specifies a type of file format required by the first user and a file size requirement that specifies a maximum and/or minimum size of file required by the first user, and wherein the media file comprises an executable multi-media file;

receiving, by the computing device, from the sending device associated with a second user that is to provide the media file to the first user, a request for the delivery specification;

communicating, by the computing device, to the sending device, the delivery specification responsive to the request to provide the second user with the plurality of requirements specified by the first user;

receiving, by the computing device, from the sending device, the media file;

validating, by the computing device, using the delivery specification, the media file based on the plurality of requirements; and responsive to an indication that the media file is validated, and without sending the media file to the recipient device, providing, by the computing device, a notification to the sending device that the media file has been validated.

22. The method of claim 21, further comprising:

facilitating, by the computing device, communication of the media file to the first user.

23. The method of claim 22, wherein facilitating communication of the media file comprises:

causing, by the computing device, the second user to communicate the media file to the first user.

24. The method of claim 21, wherein validating the media file comprises:

receiving, by the computing device, the media file from second user;

performing, by the computing device, an analysis of the media file based on the plurality of requirements;

determining, by the computing device, that the media file is validated based on the analysis; and communicating, by the computing device, that the media file is validated responsive to the determination that the media file is validated.

25. The method of claim 24, further comprising:

causing, by the computing device, the first user to receive the media file responsive to a determination that the media file is validated.

26. The method of claim 21, wherein validating the media file comprises:

receiving, by the computing device, metadata relating to the media file separate from the media file;

performing, by the computing device, an analysis of the received metadata based on the plurality of requirements;

determining, by the computing device, that the media file is validated based on the analysis; and communicating, by the computing device, an indication that the media file is validated responsive to the determination that the media file is validated.

27. The method of claim 26, further comprising:

causing, by the computing device, the first user to receive the media file responsive to a determination that the media file is validated.

28. The method of claim 21, further comprising:

identifying, by the computing device, the second user based on an access of the delivery specification by the second user.

29. The method of claim 21, further comprising:

identifying, by the computing device, the second user based on the request by the second user for the delivery specification.

30. The method of claim 21, further comprising:

identifying, by the computing device, the second user based on a subscription of the second user to receive delivery specifications of one or more media files to be delivered to the first user.

31. The method of claim 21, the method further comprising:

receiving, by the computing device, the delivery specification from the first user via a third user.

32. The method of claim 21, wherein the delivery specification is a first type of delivery specification that is specific to a first type of content, the method further comprising:

receiving, by the computing device from the first user, a second delivery specification that includes a second plurality of requirements, specified by the first user, of a second media file to be delivered to the first user, wherein the second delivery specification is a second type of delivery specification that is specific to a second type of content different from the first type of content, and wherein the second plurality of requirements are different from the plurality of requirements.

33. The method of claim 32, wherein the first type of content relates to high-definition content such that the delivery specification specifies requirements for high-definition types of content, and wherein the second type of content relates to standard-definition content such that the second delivery specification specifies requirements for standard-definition types of content.

34. The method of claim 32, wherein the first type of content comprises a first type of programming and the second type of content comprises a second type of programming.

35. The method of claim 21, wherein the first user is associated with a television channel or network, and wherein the delivery specification relates to content to be displayed on the television channel or network.

36. The method of claim 21, wherein the request from the second user for the delivery specification is received by the computing device via one or more of: a webpage, a web portal, an agent on a device associated with the second user, and an electronic mail.

37. The method of claim 21, wherein the computing device is further programmed to:
receiving, by the computing device from the second user, a request to subscribe to one or more delivery specifications associated with the first user;
storing, by the computing device, subscription information that indicates that the second user is a subscriber to one or more delivery specifications associated with the first user;
identifying, by the computing device, one or more subscribers, including the second user, of the one or more delivery specifications associated with the first user based on the subscription information responsive to a receipt of a delivery specification from the first user; and
communicating, by the computing device, an indication to the one or more subscribers that the delivery specification has been received from the first user.

38. The method of claim 24, wherein performing the analysis of the received media file based on the plurality of requirements comprises:
determining, by the computing device, whether the received media file satisfies the file type requirement; and
determining, by the computing device, whether the received media file satisfies the file size requirement.

39. The method of claim 26, wherein performing the analysis of the received information based on the plurality of requirements comprises:
determining, by the computing device, whether the received information indicates that the media file satisfies the file type requirement; and
determining, by the computing device, whether the received information indicates that the media file satisfies the file size requirement.

40. A system for facilitating communication of digital media content, the system comprising:
a computing device comprising one or more physical processors programmed with computer program instructions, which when executed by the one or more physical processors cause the computing device to:
receive, from a sending device associated with a providing user, a media file and identifying information that identifies a recipient user to receive the media file, wherein the media file comprises an executable multi-media file;
obtain, based on the identifying information, a delivery specification relating to the recipient user, wherein the delivery specification includes a plurality of requirements, specified by the recipient user, of one or more files to be delivered to the recipient user, and wherein the delivery specification is used to determine whether the media file is acceptable to the recipient user, and wherein the plurality of requirements include at least a file type requirement that specifies a type of file format required by the recipient user and a file size requirement that specifies a maximum and/or minimum size of file required by the recipient user;
determine one or more attributes of the media file;
validate the media file based on the delivery specification and the one or more attributes of the media file; and
responsive to an indication that the media file is validated, and without sending the media file to a recipient device associated with the recipient user, provide a notification to the sending device that the media file has been validated.

41. A method for facilitating communication of digital media content, the method being implemented on a computing device comprising one or more physical processors programmed with computer program instructions, which when executed by the one or more physical processors cause the computing device to perform the method, the method comprising:
receiving, by the computing device, from a sending device associated with a providing user, a media file and identifying information that identifies a recipient user to receive the media file, wherein the media file comprises an executable multi-media file;
obtaining, by the computing device, based on the identifying information, a delivery specification relating to the recipient user, wherein the delivery specification includes a plurality of requirements, specified by the recipient user, of one or more files to be delivered to the recipient user, and wherein the delivery specification is used to determine whether the media file is acceptable to the recipient user, and wherein the plurality of requirements include at least a file type requirement that specifies a type of file format required by the recipient user and a file size requirement that specifies a maximum and/or minimum size of file required by the recipient user;
determining, by the computing device, one or more attributes of the media file;
validating, by the computing device, the media file based on the delivery specification and the one or more attributes of the media file; and
responsive to an indication that the media file is validated, and without sending the media file to a recipient device associated with the recipient user, providing, by the computing device, a notification to the sending device that the media file has been validated.

\* \* \* \* \*

UNITED STATES PATENT AND TRADEMARK OFFICE
CERTIFICATE OF CORRECTION

PATENT NO. : 9,692,799 B2  
APPLICATION NO. : 13/561461  
DATED : June 27, 2017  
INVENTOR(S) : Michael Gregory Nash et al.

Page 1 of 1

It is certified that error appears in the above-identified patent and that said Letters Patent is hereby corrected as shown below:

In the Claims

Claim 14, Line 1, (Column 14, Line 54), please change "1," to --12,--.

Signed and Sealed this  
Fifth Day of September, 2017

Joseph Matal  
*Performing the Functions and Duties of the*  
*Under Secretary of Commerce for Intellectual Property and*  
*Director of the United States Patent and Trademark Office*